United States Patent
Ashmore et al.

(10) Patent No.: US 7,558,981 B2
(45) Date of Patent: Jul. 7, 2009

(54) METHOD AND APPARATUS FOR MIRRORING CUSTOMER DATA AND METADATA IN PAIRED CONTROLLERS

(75) Inventors: Paul Andrew Ashmore, Longmont, CO (US); Gene Maine, Erie, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 513 days.

(21) Appl. No.: 11/253,385

(22) Filed: Oct. 18, 2005

(65) Prior Publication Data

US 2007/0088975 A1 Apr. 19, 2007

(51) Int. Cl.
*G06F 11/00* (2006.01)
(52) U.S. Cl. .............................. 714/6; 711/113; 711/162
(58) Field of Classification Search .................... 714/6; 711/113, 119, 124, 144, 162
See application file for complete search history.

(56) References Cited

U.S. PATENT DOCUMENTS

| | | | |
|---|---|---|---|
| 5,586,291 A * | 12/1996 | Lasker et al. ................. | 711/113 |
| 5,712,970 A * | 1/1998 | Arnott et al. ................... | 714/6 |
| 5,761,705 A | 6/1998 | DeKoning et al. | |
| 6,073,218 A * | 6/2000 | DeKoning et al. .......... | 711/150 |
| 6,145,059 A * | 11/2000 | Arimilli et al. .............. | 711/143 |
| 6,148,368 A | 11/2000 | DeKoning | |
| 6,247,099 B1 * | 6/2001 | Skazinski et al. ........... | 711/141 |
| 6,321,298 B1 | 11/2001 | Hubis | |
| 6,381,674 B2 | 4/2002 | DeKoning et al. | |
| 6,457,098 B1 | 9/2002 | DeKoning et al. | |
| 6,510,500 B2 * | 1/2003 | Sarkar ........................ | 711/162 |
| 6,557,075 B1 | 4/2003 | Maher | |
| 6,574,709 B1 * | 6/2003 | Skazinski et al. ........... | 711/119 |
| 6,795,850 B2 | 9/2004 | Wu et al. | |
| 6,842,829 B1 | 1/2005 | Nichols et al. | |
| 6,928,521 B1 | 8/2005 | Burton et al. | |
| 7,117,310 B2 * | 10/2006 | Chatterjee et al. ........... | 711/141 |

OTHER PUBLICATIONS

International Search Report of the International Searching Authority on the corresponding international application PCT/US06/40093 issued on Dec. 4, 2007, 3 pages.
International Written Opinion of the International Searching Authority on the corresponding international application PCT/US06/40093 issued on Dec. 4, 2007, 7 pages.

* cited by examiner

*Primary Examiner*—Robert Beausoliel
*Assistant Examiner*—Philip Guyton
(74) *Attorney, Agent, or Firm*—Sheridan Ross P.C (57) ABSTRACT

A data storage system configured for efficient mirroring of data between paired redundant controllers is provided. More particularly, in response to the receipt of customer data from a host for storage, a first controller segments the received customer data into one or more frames of data. In addition, the first controller determines or associates certain metadata for each frame of customer data, and inserts that metadata in the corresponding frame. The frames, including the metadata, are provided to a secondary controller. The secondary controller stores the customer data from a received frame in memory, and stores the corresponding metadata in another location of memory that is indexed to the location where the customer data was stored. The secondary controller may also associate a count value with each frame of data in order to distinguish the most recent frame of data should frames in memory have matching metadata.

15 Claims, 5 Drawing Sheets

METHOD AND APPARATUS FOR MIRRORING CUSTOMER DATA AND METADATA IN PAIRED CONTROLLERS

FIELD OF THE INVENTION

The present invention is directed to data storage systems having paired controllers. In particular, the present invention is directed to providing a primary controller that can provide customer data and metadata to a secondary controller without significantly interrupting storage system operation.

BACKGROUND OF THE INVENTION

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some case more than one storage device) fails. An additional advantage that can be achieved by coordinating operation of a number of individual storage devices is improved data access and/or storage response times. Examples of systems that can provide such advantages can be found in the various RAID (redundant array of independent disks) levels that have been developed.

High availability is a key concern because in many applications users rely heavily on the data stored on the RAID system. In these types of applications, unavailability of data stored on the RAID system can result in significant loss of revenue and/or customer satisfaction. Employing a RAID system in such an application enhances availability of the stored data, since if a single disk drive fails, data may still be stored and retrieved from the system. In addition to the use of a RAID system, it is common to use redundant RAID controllers to further enhance the availability of such a storage system. In such a situation, two or more controllers are used such that, if one of the controllers fails, the remaining controller will assume operations for the failed controller. The availability of the storage system is therefore enhanced, because the system can sustain a failure of a single controller and continue to operate. When using dual controllers, each controller may conduct independent read and write operations simultaneously. This is known as an active-active configuration. In an active-active configuration, customer data, including write-back data and associated parity data, and metadata are mirrored between the controllers.

In a system using two controllers, data sent from the host to be written to the disk array is typically sent to either the first active controller or the second active controller. Where the data is sent depends upon the location in the disk array to which the data will be written. In active-active systems, typically one controller is zoned to a specific array of drives or a specific area, such as a partition or logical unit number (LUN). Thus, if data is to be written to the array or array partition that the first active controller is zoned to, the data is sent to the first active controller. Likewise, if the data is to be written to an array or array partition that the second active controller is zoned to, the data is sent to the second active controller. In order to maintain redundancy between the two controllers, the data sent to the first active controller must be copied on to the second active controller. Likewise, the data sent to the second active controller must be copied onto the first active controller.

When a controller in an active-active controller pair suffers a failure, the other active controller recognizes the failure and takes control of the write and read operations of the first controller. This may include the surviving controller determining whether the failed controller had data writes outstanding. If data writes are outstanding, the surviving controller may issue a command to write the new data and parity to the target array or array partition. Furthermore, following the failure of a controller, the surviving controller can perform new write operations that would normally have been handled by the failed controller.

In a typical system, both controllers process individual host commands, including host direct memory access (DMA) operations, simultaneously. The primary controller then updates its metadata to describe the new customer data that it has received. In particular, the metadata for a chunk of customer data can include the RAID array (LUN), logical block address (LBA) and sectors (bitmap) that are present in the chunk customer data. In order to update the metadata maintained for the chunk of customer data by the secondary controller, the primary controller sends a message that is in addition and subsequent to the mirrored customer data. This extra message consumes bandwidth on the link between the controllers, and causes an interrupt to be generated in the secondary controller's central processing unit (CPU). In addition, because the message requires that a read-modify-write operation be performed by the CPU, the operation is slow. The secondary controller also updates its CPU memory tables or mirror hash table representing the new customer data. Accordingly, the typical process for mirroring data between paired controllers is time and bandwidth consuming.

SUMMARY OF THE INVENTION

The present invention is directed to solving these and other problems and disadvantages of the prior art. In accordance with embodiments of the present invention, a data storage system with paired controllers that operate to provide customer data and metadata in a single frame or message is provided. Accordingly, embodiments of the present invention facilitate the efficient operation of paired storage system controllers by avoiding sending metadata associated with mirrored data in a message that is separate from and subsequent to a message sending the customer data itself.

In accordance with embodiments of the present invention, the primary controller of a redundant controller pair receives customer data from a host. The primary controller breaks the received customer data into frames. For each frame of customer data, the primary controller associates metadata describing the frame of customer data with the customer data. The metadata for a frame of customer data is inserted in the frame, before the frame is sent to the secondary controller. The secondary controller receives frames of customer data from the primary controller, and the metadata included in a frame of data is stored in memory associated with the second controller at a location that is indexed to the location at which the customer data in the frame is stored.

In accordance with further embodiments of the present invention, the secondary controller maintains a count value that is incremented when a frame of mirrored data is received from the primary controller. The count value is included in or associated with the metadata for that frame that is stored on the secondary controller. In response to a failover condition according to which the secondary controller is required to complete writes of customer data on behalf of the primary controller, the secondary controller reads the mirrored metadata. If the LBA and LUN of metadata for one frame of customer data is found to match the LBA and LUN of metadata for any other frame of customer data, the secondary controller identifies the oldest frame of data from the respective count values associated with the frames. The oldest frame is then discarded, to prevent overwriting newer data with older data during a write operation from the secondary controller to a storage device or devices.

DETAILED DESCRIPTION

Figure 1:
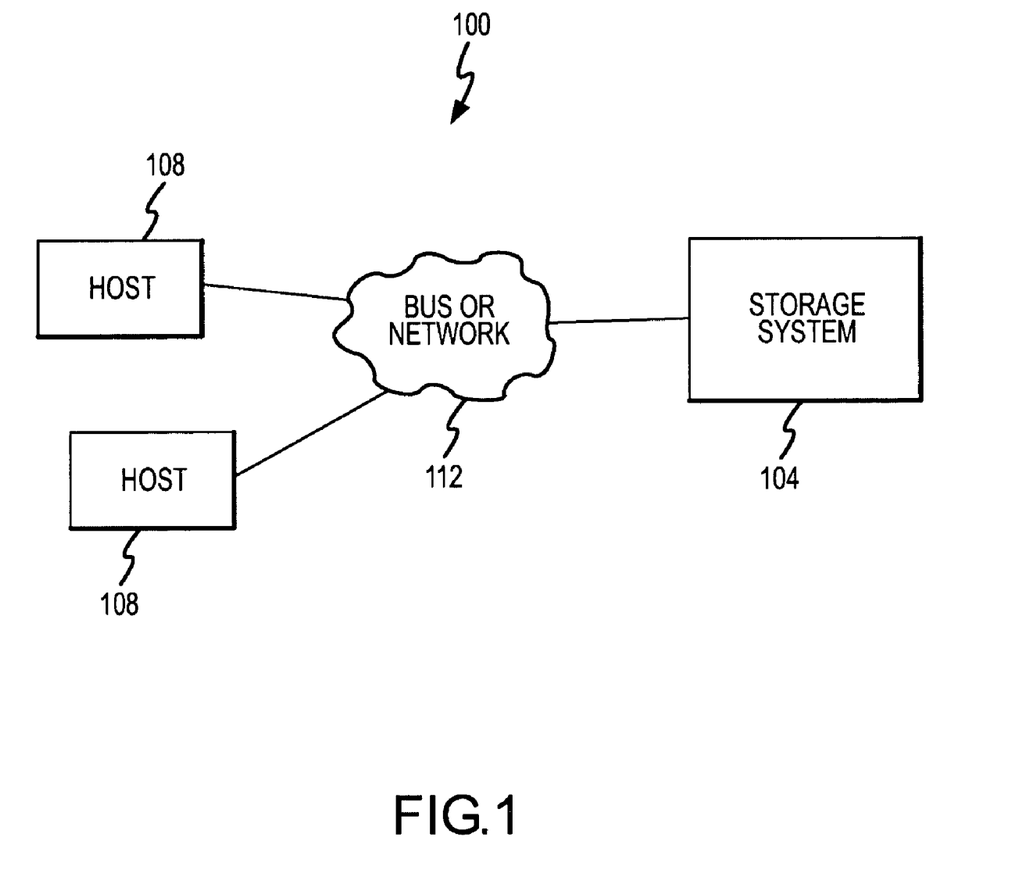
FIG. 1 is a block diagram depicting an electronic data system incorporating a data storage system in accordance with embodiments of the present invention.

FIG. 1 is a block diagram depicting an electronic data system 100 incorporating a data storage system 104 in accordance with embodiments of the present invention. In general, the data storage system 104 may be interconnected to one or more host processors or computers 108 by a host bus and/or network 112. Accordingly, embodiments of the present invention have applications in association with single or multiple hosts 108 in storage area network (SAN) or direct connect environments.

Figure 2:
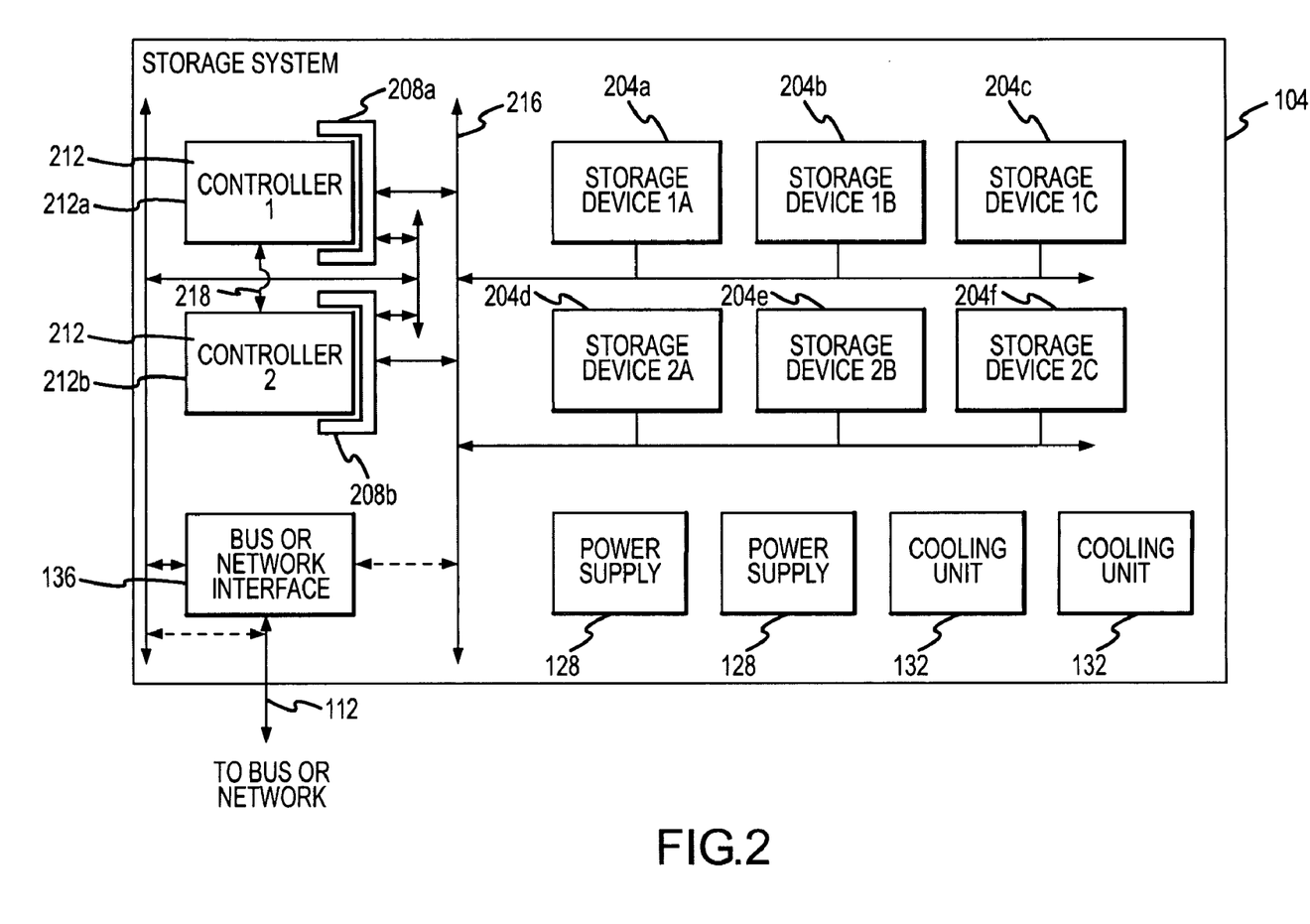
FIG. 2 is a block diagram depicting a data storage system in accordance with embodiments of the present invention.

With reference now to FIG. 2, components that may be included in a data storage system 104 in accordance with embodiments of the present invention are illustrated. In general, the data storage system 104 includes a number of storage devices 204a-f. Examples of storage devices 204 include hard disk drives, such as serial advanced technology attachment (SATA), small computer system interface (SCSI), serial attached SCSI (SAS), fiber channel (FC) or parallel advanced technology attachment (PATA) hard disk drives. Other examples of storage devices 204 include magnetic tape storage devices, optical storage devices or solid state disk devices. Furthermore, although a number of storage devices 204 are illustrated, it should be appreciated embodiments of the present invention are not limited to any particular number of storage devices, and that a lesser or greater number of storage devices 204 may be provided as part of a data storage system 104. As can be appreciated by one of skill in the art, arrays and/or array partitions, hereinafter referred to as logical unit numbers (LUNs) may be established on the data storage devices 204. As can further be appreciated by one of skill in the art, a LUN may be implemented in accordance with any one of the various RAID array levels or other arrangements for storing data on one or more storage devices 204. As can also be appreciated by one of skill in the art, data stored within logical unit numbers may be associated with a logical block address (LBA) that identifies a block and a bitmap that identifies a sector within the array at which a sector of data is stored.

A data storage system 104 in accordance with embodiments of the present invention may be provided with a first controller slot 208a and a second controller slot 208b. As can be appreciated by one of skill in the art, a controller slot 208 may comprise a connection or set of connections to enable a controller 212 to be operably interconnected to other components of the data storage system 104. Furthermore, a data storage system 104 in accordance with embodiments of the present invention includes a pair of controllers 212a-b. For example, the data storage system 104 may be operated in a dual controller mode, such as a dual controller redundant active-active controller mode. The first controller 212a is received by the first controller slot 208a, while the second controller 212b is received by the second controller slot 208b. As can be appreciated by one of skill in the art, the provision of two controllers 212a-b permits data to be mirrored between the controllers 212a-b, providing redundant controller operation. Furthermore, a data storage system 104 in accordance with embodiments of the present invention can provide an active-active dual controller mode of operation, according to which the first controller 212a operates as the primary controller with respect to a first set of LUNs while the second controller 212b operates as the secondary controller with respect to the first set of LUNs, and according to which the second controller 212b operates as the primary controller with respect to a second set of LUNs while the primary controller 212a operates as the secondary controller with respect to the second set of LUNs.

As can also be appreciated by one of skill in the art, the controller slots 208 may be configured such that a controller 212 may be removed from or added to the data storage system 104 relatively easily, to facilitate upgrade and/or maintenance operations. For example, the controller slots 208 may facilitate the provision of a controller 212 as a field replaceable unit (FRU) that can be added to the data storage system 104 or replaced as part of a plug-in type operation.

One or more storage device buses or channels 216 are generally provided to interconnect with a controller or controllers 212a-b, through the associated controller slot or slots 208a-b, to the storage devices 204. Furthermore, while illustrated as a single shared storage device bus or channel 216, it can be appreciated that a number of dedicated and/or shared storage device buses or channels may be provided. The storage device bus or channel 216 may, for example, comprise an SATA, SCSI, SAS, FC or PATA bus or channel. The storage device bus or channel 216 may also serve to interconnect the controllers 212a-b, for example to pass frames of customer data and associated metadata between the controllers as described herein. Alternatively or in addition, a link channel 218 may be provided to interconnect the controllers 212a-b.

Additional components that may be included in a data storage system 104 include one or more power supplies 128 and one or more cooling units 132. In addition, a bus or network interface 136 may be provided to interconnect the data storage system 104 to the host bus or network 112. In accordance with other embodiments of the present invention, the controllers 212 may be interconnected to the host bus or network 112 directly.

Figure 3:
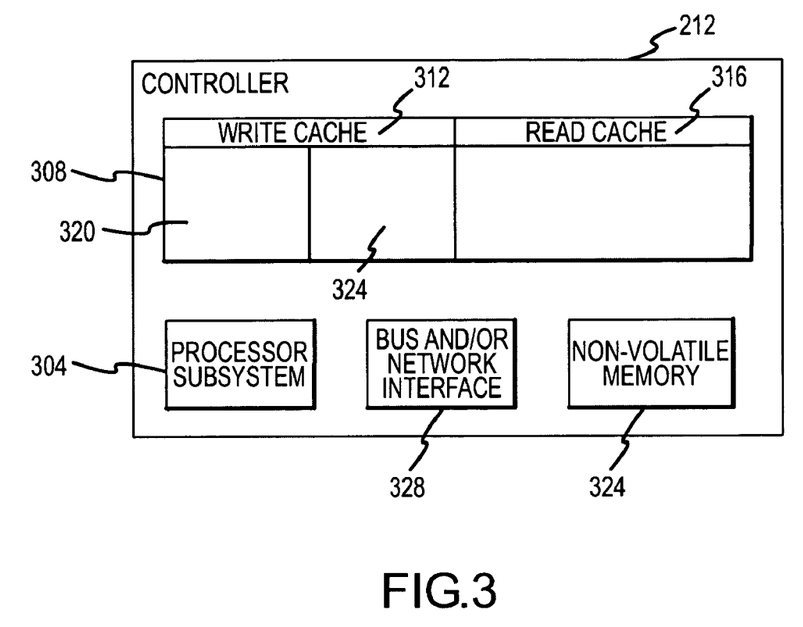
FIG. 3 is a block diagram depicting a controller in accordance with embodiments of the present invention.

With reference now to FIG. 3, aspects of a controller 212 in accordance with embodiments of the present invention are illustrated. In general, a controller 212 includes a processor subsystem 304 capable of executing instructions for performing, implementing and/or controlling various controller 212 functions. Such instructions may be stored as software and/or firmware. Furthermore, instructions carried out by the processor subsystem 304 may comprise the operation of hardwired logic. For example, operations of a controller 212 related to creating frames of customer data and associated metadata may be performed by executing instructions stored in software or firmware. As a further example, operations concerning the generation of parity data may be performed using hardwired logic circuits provided as part of the processor subsystem 304. Accordingly, the processor subsystem 304 may be implemented as a number of discrete components, such as one or more programmable processors in combination with one or more hardwired logic circuits. The processor subsystem 304 may also include or be implemented as one or more integrated devices, including, for example, application specific integrated circuits (ASICs).

A controller 212 also generally includes memory 308. The memory 308 is divided or partitioned into at least first and second partitions comprising a write cache 312 and a read cache 316. As can be appreciated by one of skill in the art, by providing caches 312, 316, a controller can improve the speed of input/output (IO) operations between a host 108 and the data storage devices 204 comprising an array or array partition. As can further be appreciated by one of skill in the art, a controller 212 typically reports to the relevant host 108 that a write operation has been completed after data associated with that operation has been written to the write cache 312. As can also be appreciated by one of skill in the art, the indication that a write operation has been completed will generally be given to the host even though data has not yet been successfully written to a data storage device or devices 204. Therefore, while providing this early indication of the completion of a write is advantageous in that it allows the host 108 to discard the data provided as part of the write operation, improving overall data system 100 performance, it risks the loss of that data should the controller 212, the target device or devices 204, the bus or channel 216 interconnecting the controller 212 to the source device or devices 204, or some other component or operation fail. For this reason, it is often considered desirable to provide dual redundant controllers 212 in which data comprising a write operation being primarily handled by one controller 212 is mirrored to a partner controller 212. The memory 308 of the first controller 212a and the memory 308 of the second controller 212b have the same memory map and the same memory size. The memory 308 is not specifically limited to memory of any particular type. For example, the memory 308 may comprise a solid state memory device. As a further example, the memory 308 may comprise a number of solid state memory devices. In a typical implementation, the memory 308 comprises volatile memory.

In order to support the mirroring of data, the write cache 312 is segmented into first and second segments 320 and 324. One segment 320 is used to cache write operations that the controller 212 is primarily responsible for (i.e., write operations involving LUNs owned by the subject controller 212). The second segment (e.g., segment 324) is, according to embodiments of the present invention, used as a cache for data involving write operations associated with LUNs that are not owned by or zoned to the subject controller 212. That is, the second segment 324 of the write cache 312 is used in connection with LUNs that are separable from those directed to LUNs associated with the first segment 320, and in particular is used as a write cache for data mirrored from a partner controller 212 when the subject controller 212 is associated with a data storage system 104 operating in a dual controller mode.

A controller 212 may additionally include other components. For example, a bus and/or network interface 328 may be provided for operably interconnecting the controller 212 to the host processors or computers 108, for example through a controller slot 208 and a host bus or channel 112. Furthermore, the interface 328 may be physically configured to facilitate removal or replacement of the controller 212 in a controller slot 208 as a field replaceable unit (FRU).

Figure 4:
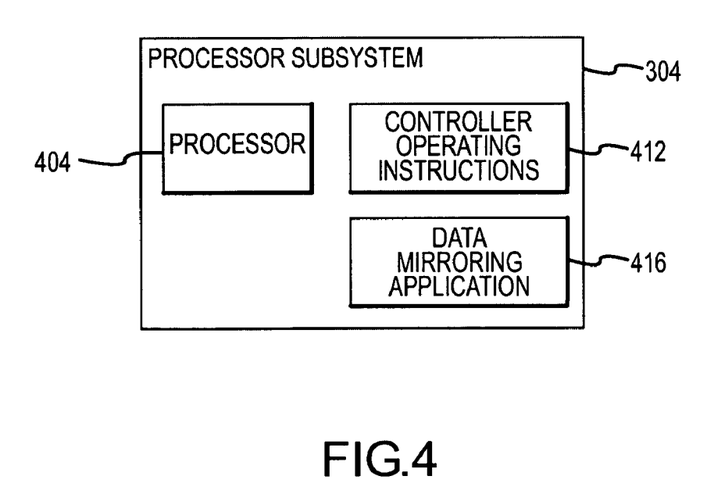
FIG. 4 is a block diagram depicting a processor subsystem of a controller in accordance with embodiments of the present invention.

With reference to FIG. 4, components and/or tasks that may be included in or performed by a processor subsystem 304 in accordance with embodiments of the present invention are illustrated. Such components may include a processor 404 capable of executing instructions in connection with performing, implementing and/or controlling various controller 212 functions. The instructions may be stored as software and/or firmware. For example, an application or instruction set comprising controller operating instructions 412 and an application or instruction set comprising a data mirroring application 416 as described herein may be maintained by or included in the processor subsystem 304. Functions of the processor 404 that may be performed in connection with the execution of controller operating instructions 412 include, for example, the distribution of data across multiple storage devices 204, the detection of power outages and the transfer of data held in the write cache 312 to non-volatile memory 324 in response to the detection of power outages. Functions of the processor 404 that may be performed in connection with the execution of the data mirroring application 416 include the generation of data frames and associated metadata on a controller 212 operating as a primary controller 212, as described herein. In addition, through execution of the data mirroring application 416 on a controller 212 operating as a secondary controller 212, the processor 404 may function to place metadata and customer data in appropriate areas of memory, to maintain a count value that is incremented for each received frame, and to assign a current count value to a received frame. Furthermore, although various discrete devices can be used to implement a processor subsystem 304 in accordance with embodiments of the present invention, other embodiments of a processor subsystem 304 may include components that are at least partially integrated. For example, a processor subsystem 304 may incorporate or be implemented as a central processing unit (CPU), microprocessor, digital signal processor (DSP) or application specific integrated circuit (ASIC).

Figure 5:
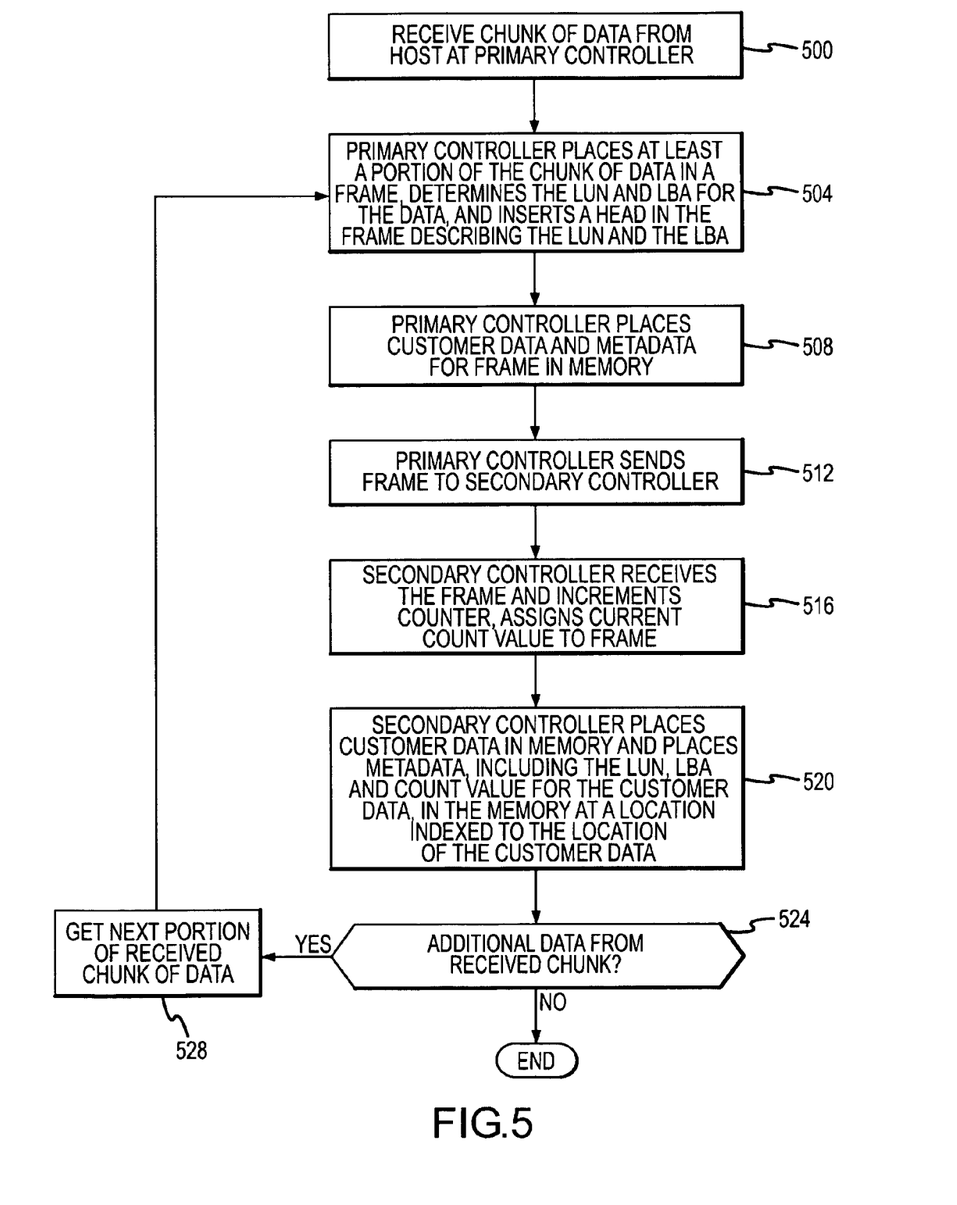
FIG. 5 is a flowchart depicting aspects of the operation of a data storage system in accordance with embodiments of the present invention.

With reference to FIG. 5, aspects of the operation of a data storage system 104 incorporating a pair of controllers 212 implementing data mirroring in accordance with embodiments of the present invention are illustrated. Initially, at step 500, a chunk of customer data is received from a host processor or computer 108 at the primary controller 212 (e.g. first controller 212a) of a controller pair 212 providing redundant operation. The primary controller 212 places at least a portion of the chunk of customer data in a frame, determines the LUN and LBA for the customer data, and inserts a head in the frame describing the RAID array (LUN) and the logical block address (LBA) of the data included in the frame (step 504). Metadata in addition to the LUN and LBA may also be included in the head of the frame. At step 508, the primary controller 212 places the customer data included in the frame and the associated metadata in memory 308. More particularly, the customer data and the associated metadata may be placed in different locations included in the segment 320 of the write cache 312 that is used to cache write operations that the controller 212 is primarily responsible for (i.e., write operations involving LUNs owned by the subject controller 212). The frame of customer data and associated metadata is then sent to the secondary controller 212 (e.g. second controller 212b)(step 512).

The secondary controller 212 receives the frame, increments a count value held by a counter, and assigns the current count value to the received frame (step 516). In accordance with embodiments of the present invention, the counter may be established and maintained by the data mirroring application or task 416 of the processor subsystem 304 of the secondary controller 212. The secondary controller 212 then places the customer data in memory 308 and places the metadata, including the LUN, LBA and assigned count value for the customer data in the memory 308 at a location that is different than the location of the customer data but that is indexed to the location of the customer data (step 520). Accordingly, the association of the customer data in the received frame and the metadata for that customer data is maintained by storing the metadata in a location in memory 308 that corresponds to the location of the customer data in memory 308. In accordance with embodiments of the present invention, the customer data from the received frame and the associated metadata may be placed in different locations of the write cache 312 included in the memory 308 provided as part of the secondary controller 212. More particularly, the secondary controller 212 may place the data from the received frame and the associated metadata in different locations within the segment 324 of memory 308 that is used as a cache for data involving write operations associated with LUNs that are not owned by or zoned to the subject controller 212. That is, the second segment 324 of the write cache 312 is used in connection with LUNs that are separable from those directed to LUNs associated with the first segment 320, and in particular is used as a write cache for data mirrored from a partner controller 212. Moreover, the address of the metadata in the memory 308 of the primary controller 212 is the same as the address of the copy of that metadata in memory 308 of the secondary controller 212. Similarly, the address of the customer data in the memory 308 of the primary controller 212 is the same as the address of the copy of that customer data in the memory 308 of the secondary controller 212.

At step 524 a determination is made as to whether there is additional data from the received chunk that remains to be placed into a frame, associated with metadata, and mirrored from the primary controller 212 to the secondary controller 212. If additional data remains to be mirrored, the next portion of the received chunk of data is obtained or identified (step 528), and the process returns to step 504. If no more data from the received chunk remains to be mirrored from the primary controller 212 to the secondary controller 212, the process for mirroring customer data may end.

As can be appreciated by one of skill in the art from the description provided herein, embodiments of the present invention provide for the mirroring of a segment of customer data from a primary controller 212 to a secondary controller 212 in a single message or frame, without requiring a separate message and without causing the generation of an interrupt on the second controller 212 in order to provide the second controller with metadata for the segment of customer data. In addition, it can be appreciated that in an active-active arrangement, one controller 212 may operate as the primary controller 212 with respect to operations involving a first set of LUNs, while that same controller 212 may operate as a secondary controller 212 with respect to operations involving a second set of LUNs.

Figure 6:
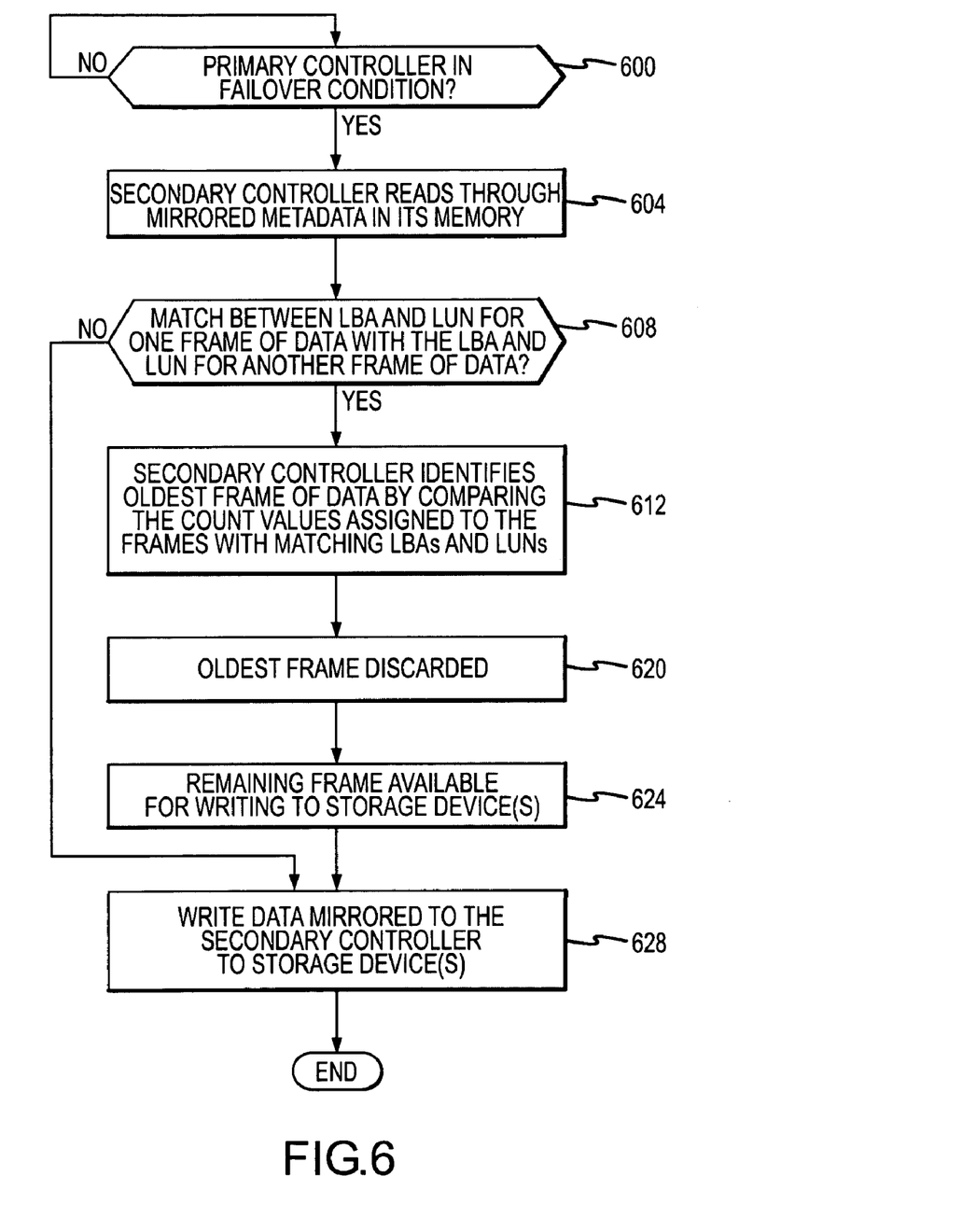
FIG. 6 is a flowchart depicting other aspects of the operation of a data storage system in accordance with embodiments of the present invention.

With reference to FIG. 6, aspects of the operation of a storage system 104 in connection with a failover condition in which the primary controller 212 has failed and the secondary controller 212 performs write operations (i.e., writes data from the write cache that was mirrored from the primary controller 212) on behalf of the primary controller 212 are illustrated. Initially, a determination is made as to whether the primary controller 212 is in a failover condition that requires writing data mirrored to the secondary controller 212 to one or more storage devices 204 (step 600). If the primary controller is not in a failover condition, the process may idle at step 600.

If the primary controller 212 is determined to be in a failover condition, the secondary controller reads through the mirrored metadata in its memory 308 (step 604). A determination is then made as to whether the metadata for one frame of customer data includes an LBA and an LUN that matches the LBA and LUN for another frame of data in the secondary controller's 212 memory 308 (step 608). If frames with matching LBAs and LUNs are identified by the secondary controller 212, the secondary controller 212 identifies which of the frames is oldest by comparing the count values assigned to the frames (step 612). After identifying the oldest frame, that frame is discarded (step 620), and the remaining frame is made available for writing to the storage device or devices 204 (step 624). Once the oldest frames with LBAs and LUNs that match the LBAs and LUNs of newer frames are identified and discarded, or after determining that there are no matches between the LBAs and LUNs of any of the cached data frames, the remaining frames are written to the storage device or devices 204 (step 628). Accordingly, redundancy with respect to write operations pending in the primary controller 212 when that controller 212 fails is provided by a secondary controller 212 that receives frames of mirrored data that include metadata as described herein.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for mirroring data between controllers in a storage system, comprising:
   with respect to a first controller operating as a primary controller:
      receiving first customer data from a host;
      creating a number of frames including at least a first frame, wherein the first frame includes at least some of the first customer data, wherein said creating the first frame includes generating metadata associated with the first customer data included in the first frame and including the metadata in the first frame;
      placing the at least some of the first customer data included in the first frame in a write cache in the first controller;
      sending the number of frames including the first frame to a second controller, wherein the first controller is operating as a primary controller with respect to the first customer data and the second controller is operating as a secondary controller with respect to the first customer data;
   with respect to the second controller:
      maintaining a count value;
      receiving the first frame;
      for each frame of data received from the first controller, incrementing the count value; and assigning a current count value to each frame included in the number of frames;

determining a location in memory associated with the second controller for the metadata associated with the first customer data, wherein the location is based on an offset indexing a portion of said memory for maintaining the customer data to a portion of the memory for maintaining the metadata associated with the customer data;

placing at least some of the metadata associated with the first customer data in the determined location in memory associated with the second controller;

in response to a failure of the first controller, performing a failover operation, wherein the second controller:

determines that at least some metadata for at least two different frames mirrored to the second controller matches;

determining which of the frames with matching metadata is oldest from the count value for the frames with matching metadata; and discarding the oldest of the matching frames.

2. The method of claim 1, further comprising:

in response to the count value rolling over from a maximum value to an initial value, generating an interrupt;

in response to the interrupt, flushing the memory of the second controller.

3. The method of claim 1, wherein the metadata includes at least a first logical unit number (LUN), logical block address (LBA) and sectors (bitmap) of the at least some of the customer data included in the first frame.

4. The method of claim 1, wherein a first communication network or channel interconnects said first and second controllers to the host.

5. The method of claim 4, wherein the first and second controllers are additionally interconnected to one another by a second communication network or channel.

6. The method of claim 1, wherein the memory associated with the first controller and the memory associated with the second controller comprises volatile memory, the method further comprising:

in response to detecting a loss of main power, storing at least some of the customer data and metadata from said volatile memory to non-volatile memory associated with the respective controller.

7. The method of claim 1, wherein the customer data and the associated metadata are stored in separate areas of a memory associated with the first controller and the memory associated with the second controllers.

8. The method of claim 1, further comprising:

with respect to the second controller:

receiving second customer data from the host;

creating at least a second frame, wherein the second frame includes at least some of the second customer data, wherein said creating a second frame includes generating metadata associated with the second customer data included in the second frame and including the metadata in the second frame;

placing the customer data included in the second frame in a write cache in the second controller;

sending the second frame to the first controller, wherein the second controller is operating as a primary controller with respect to the second customer data and the first controller is operating as a secondary controller with respect to the second customer data.

9. A storage system, comprising:

a first controller, said first controller including:

a first communication channel interface;

first memory; and a first processor, wherein customer data received at said first communication channel interface is divided into frames and stored in said first memory, wherein metadata is associated with each of said frames and inserted into the frame, and wherein the metadata associated with each of the frames of customer data is stored in said first memory at a location indexed to the customer data;

a second controller, said second controller including:

second memory, wherein said second memory is partitioned into read cache and write cache portions; and a second processor, wherein a frame of data received from said first controller containing customer data and associated metadata is placed at a first location in said second memory, wherein metadata included in said frame of data received from said first controller is stored at a second location in said second memory that is indexed to said first location in said second memory, wherein a count value is maintained, wherein the count value is incremented for the frame of data received from said first controller, wherein the frame is assigned the current count value, and wherein in response to a failure of said first controller said second controller performs a failover operation that includes determining that at least some metadata for at least two different frames of data received from said first controller matches, determining which of the frames with at least some matching metadata is oldest by examining the assigned count value, and discarding the oldest frame with at least some matching metadata;

a communication channel, wherein said first and second controllers are interconnected by said communication channel.

10. The system of claim 9, wherein said first controller comprises a primary controller with respect to a first set of logical unit numbers (LUNs), wherein said first controller comprises a secondary controller with respect to a second set of LUNs, wherein said second controller comprises a primary controller with respect to said second set of LUNs, and wherein said second controller comprises a secondary controller with respect to said first set of LUNs.

11. The system of claim 10, further comprising:

a number of storage devices, wherein said number of storage devices comprise at least a first array corresponding to at least a first LUN;

a device network, wherein said first and second controllers are in communication with said number of storage devices over said device network.

12. The system of claim 11, further comprising:

a host; and a communication channel interconnecting said host to said first and second controllers, wherein with respect to said first set of LUNs said host provides customer data to said first controller as part of a direct memory access (DMA) operation.

13. The system of claim 10, wherein said first memory is partitioned into read cache and write cache portions, and wherein a configuration of said write cache portion of said first controller is identical to a configuration of said write cache portion of said second controller.

14. A data storage system, comprising:
means for requesting input/output (IO) operations;
first means for controlling data IO operations, including:
- means for dividing a chunk of received customer data from said means for requesting IO operations into frames;
- means for associating metadata with each of said frames of customer data to create frames of customer data and associated metadata; and
- means for caching said frames of customer data and associated metadata;

second means for controlling data JO operations in communication with said first means for controlling data IO operations, including:
- means for reading metadata associated with frames of customer data received from said first means for controlling data IO operations;
- means for caching said frames of customer data in a first location and for caching said associated metadata in a second location that is indexed to said first location;
- means for maintaining a count value, wherein said count value is incremented for each frame of customer data received from said first means for controlling data IO operations, and wherein a current count value is associated with each set of metadata associated with a frame of customer data that is received from said first means for controlling data IO operations, wherein in response to a failure of the first means for controlling data IO operations the second means for controlling data IO operations performs a failover operation that includes determining that a logical block address (LBA) and a logical unit number (LUN) of metadata associated with a first frame of customer data and associated metadata matches an LBA and an LUN of metadata associated with a second frame of customer data and associated metadata, determining which of the frames of customer data and associated metadata is oldest by examining the count values assigned to the frames, and discarding the oldest of the first frame of customer data and associated metadata and the second frame of customer data and associated metadata.

15. The system of claim 14, further comprising:
a plurality of means for storing data in communication with said first and second means for controlling data IO operations.

\* \* \* \* \*